United States Patent [19]

Namiki

[11] Patent Number: 4,734,556
[45] Date of Patent: Mar. 29, 1988

[54] INVERTER TYPE DC RESISTANCE WELDING MACHINE

[75] Inventor: Mitsuo Namiki, Urawa, Japan

[73] Assignee: Miyachi Electronic Company, Chiba, Japan

[21] Appl. No.: 64,606

[22] Filed: Jun. 22, 1987

[30] Foreign Application Priority Data

Oct. 18, 1986 [JP] Japan ................................ 61-247894

[51] Int. Cl.$^4$ .............................................. B23K 11/24
[52] U.S. Cl. ................................. 219/110; 219/117.1
[58] Field of Search ................... 219/110, 109, 117.1, 219/130.33, 108; 363/97, 98

[56] References Cited

U.S. PATENT DOCUMENTS

| | | | |
|---|---|---|---|
| 3,194,939 | 7/1965 | Hill | 219/110 |
| 3,445,768 | 5/1969 | Ferguson | 219/109 |
| 3,636,298 | 1/1972 | Risberg et al. | 219/108 |
| 3,895,212 | 7/1975 | Maxwell et al. | 219/130.33 |

Primary Examiner—Clifford C. Shaw
Attorney, Agent, or Firm—Wenderoth, Lind & Ponack

[57] ABSTRACT

Disclosed is an inverter type DC welding machine incorporating constant-power control to assure a high and reliable quality of weld. The pulse width of the high-frequency output of the inverter circuit is controlled at the inverter switching rate by the constant-power control on a feedback loop basis in which the value of a weld power actually supplied to the portion to be welded between electrodes is computed and the computed value is compared with the value of a reference weld power to produce an error signal for controlling the operation of the inverter circuit, so that the actual weld power is maintained constant regardless of variations in the resistance of the portion to be welded during a welding operation.

5 Claims, 5 Drawing Figures

INVERTER TYPE DC RESISTANCE WELDING MACHINE

BACKGROUND OF THE INVENTION

This invention relates to a DC resistance welding machine incorporating an inverter and, more particularly to a weld power control system for such welding machine assuring a high and reliable quality of weld.

Recently, DC resistance welding machines that utilize an invertor in its power circuit have been developed and are spreading in the market.

As compared with conventional single phase AC resistance welding machine, the invertor type DC welding machine has the following advantages.

First, it is possible to reduce the size of a welding transformer incorporated in the inverter type welding machine since a high-frequency power is passed through the transformer. In applying the welding machine to a welding robot, such small sized transformer can be mounted on the end portion of an arm of the robot with no cable or electrical wire being necessary between the secondary coil of the transformer and a welding gun, thereby saving both cost and power consumption.

Secondly, DC welding by the inverter type welding machine is of higher heating efficiency, and needs a smaller weld current or a shorter duration of current flow or conduction in workpieces as compared with AC welding by the AC welding machine, thus, it is economical in power consumption and the life of electrodes can be elongated.

Thirdly, commercial three phase AC can be utilized as the power source of the inverter type welding machine, in which three phase balanced load and high power factor are obtained.

Heretofore proposed inverter type DC welding machines generally incorporate a constant-current controller or timer which functions to maintain constant the RMS value of weld current flowing during a welding operation. The controller or the timer is based on the idea of a constant-current phase control system of the single phase AC type welding machine and the weld current is deemed as the principal factor to obtain stable and high quality weld.

However, the weld current is DC in the inverter type welding machine while AC in the single phase AC type welding machine, and when such DC weld current is maintained constant, there arises some disadvantages. In case where workpieces to be welded are small metal assemblies or thin sheet of metal, for example, the resistance of the portion to be welded of the workpieces being located between electrodes varies rapidly during very short duration of welding operation such as 10~20 msec, and the contact resistance between the electrodes and workpieces in the beginning of the welding operation is relatively high due to a low pressure being appilied between the electrodes. In maintaining the weld current constant despite of such high contact resistance condition, it sometimes makes the resistance heat generation excessive which may be cause splashing or explosion of the melted workpieces. Furthermore, when the weld current is maintained constant even though the whole resistance between the electrodes has become decreased due to increase of the contact surface area between the electrodes and the workpieces in the last stage of the welding operation, it is sometimes results in that the the current density in the portion to be welded is too low to generate a sufficientquantity of resistance heat for obtaining a good weld.

SUMMARY OF THE INVENTION

It is therefore an object of the present invention to provide an inverter type DC resistance welding machine which assures a high and reliable quality of weld.

It is another object of the present invention to provide an inverter type DC resistance welding machine which performs a stable resistance welding regardless of variations in the resistance of the portion to be welded between electrodes during a welding operation.

It is a further object of the present invention to provide an inverter type DC resistance welding machine which causes neither splashing of melted workpieces nor power shortage during welding operation for workpieces such as small metal assemblies, thin sheet of metal or the like.

In accordance with the present invention, a weld power control is provided which functions at the inverter switching rate to maintain constant a weld power supplied to the welded portion of workpieces between electrodes during a welding operation, thereby assuring that the resistance welding results in a high and reliable quality of weld.

BRIEF DESCRIPTION OF THE DRAWINGS

The foregoing and other objects, features and advantages of this invention will be aparent from the following description taken in connection with the drawings in which.

PREFERRED EMBODIMENT OF THE INVENTION

First, the fundamental operation of the present invention will be described with reference to FIG. 3 through FIG. 5 before explaining a preferred embodiment of the present invention.

Figure 3:
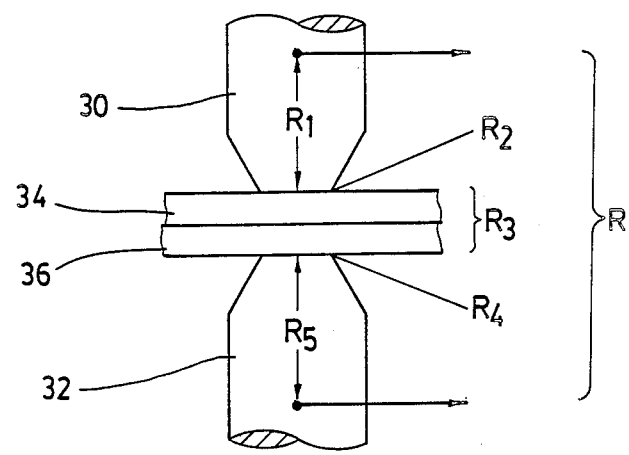
FIG. 3 is a schematic view illustrating a resistance welding.

Referring to FIG. 3, it is shown that a pair of electrodes designated at 30 and 32 are pressed at a predetermined pressure against the opposite sides of workpieces designated at 34 and 36. Under such condition, a weld voltage V is applied between the electrodes 30 and 32 so that a weld current I flows through the electrodes 30 and 32 and the workpieces 34 and 36. Symbols $R_1$ and $R_5$ denote the resistances of the electrodes 30 and 32 respectively, $R_2$ and $R_4$ denote the resistances of the contact surfaces between the electrodes 30 and 32 and the workpieces 34 and 36 respectively, and $R_3$ the total resistance of the workpieces 34 and 36. Each of the resistances $R_1 \sim R_5$ when the weld current I flows, generates an amount of heat according to Joule's law. The power P consumed between the electrodes 30 and 32 is expressed by the following equation.

$$P=IV=I^2R=I^2(R_1+R_2+R_3+R_4+R_5)$$

In accordance with a constant-power control system of the present invention, changes in any of the resistances $R_1 \sim R_5$ during a welding operation are compensated by changing the weld voltage V or the weld current I at the inverter switching rate on a feedback loop basis so that the weld power P is maintained substantially constant, thereby obtaining a good result of weld.

Figure 4:
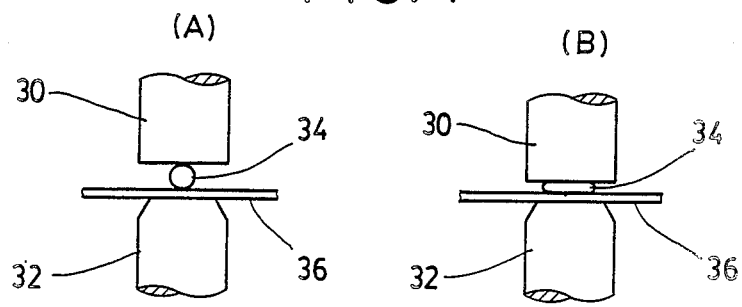
FIG. 4 is a schematic view illustrating a change in the portion being welded between the beginning and the last stage of a welding operation for small workpieces.
Figure 5:
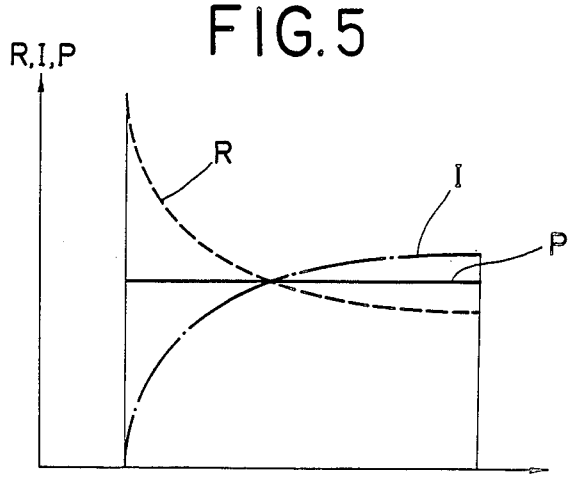
FIG. 5 is a diagram showing the relationship between the time and the resistance R between elecrtrodes, the weld current I and the weld power P, respectively, during a welding operation for small workpieces.

FIG. 4 shows a resistance welding in which one workpiece 34 is a small sized metal having a spherical configuration and the other workpiece 36 is a thin plate of metal. In such welding, the small member 34 is in line-contact with the thin plate 36 at the beginning of the welding operation (FIG. 4-A), and the member 34 is compressed or collapsed and is in surface-contact with the plate 36 at the last stage of the welding operation (FIG. 4-B). Thus, the whole resistance R (especially $R_2$, $R_3$ and $R_4$) changes rapidly from a relatively high initial value to a relatively low final value during a relatively short time period of the welding operation as shown in FIG. 5. When the weld current I is maintained constant during such change in the resistance R, a splashing of melted metal may occur in the beginning of the welding operation, while there may be a shortage of weld power in the last stage of the welding operation. However, according to the constant-power control system of the present invention, the weld current I is changed in the manner that it is suppressed at a relatively low value at the beginning of the welding operation and is increased in response to the decrease of the resistance R as the welding operation proceeds, so that the weld power P is held constant during the welding operation, leading to a good result of weld, and such control is effected at the inverter switching rate.

It is noted that the present invention can also be applied effectively to other kinds of workpieces, for example having a high inherent resistance or high surface resistance.

Figure 1:
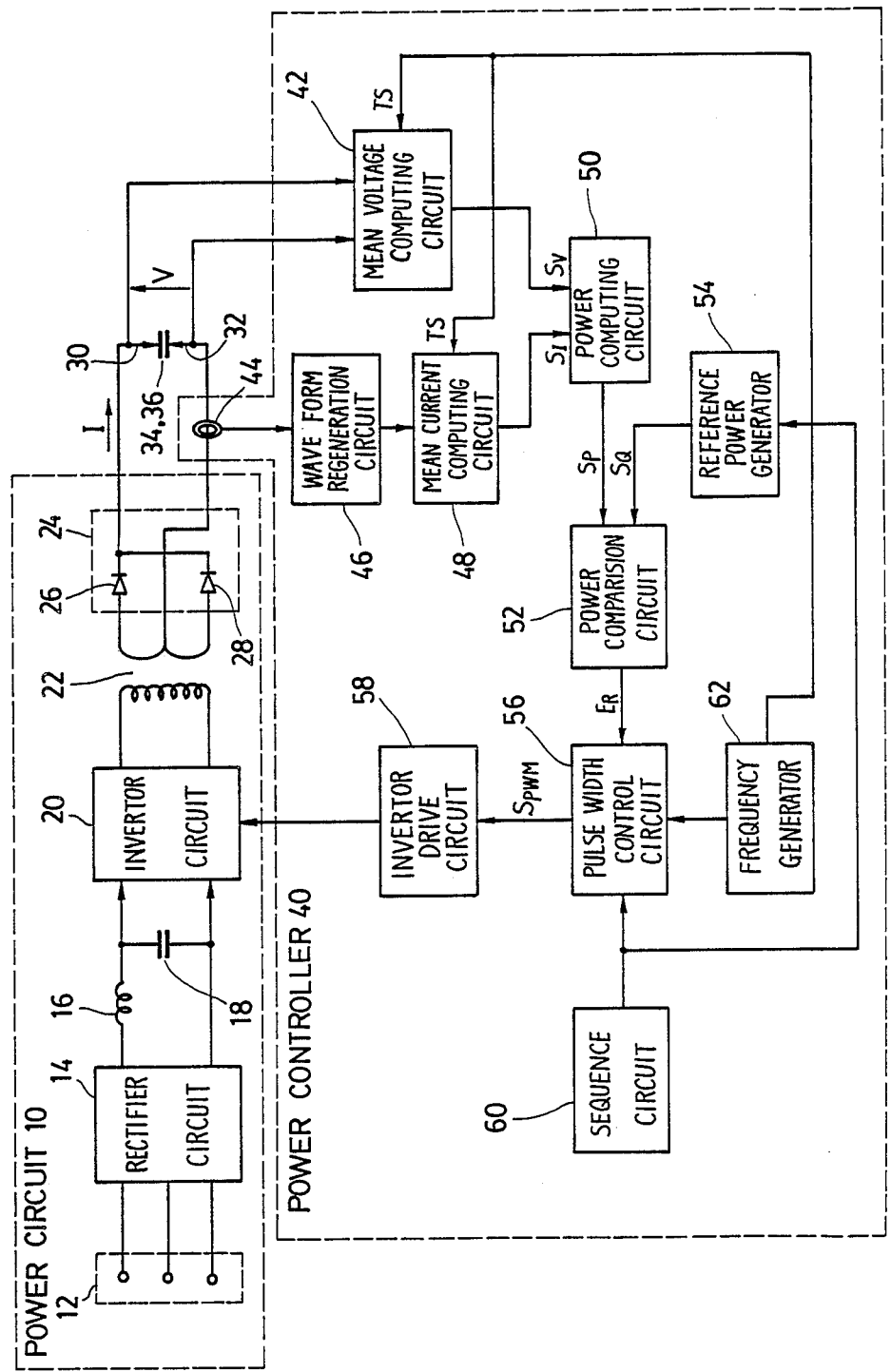
FIG. 1 is a block diagram of an inverter type DC resistance welding machine according to a preferred embodiment of the present invention.

Referring to FIG. 1, there is shown an inverter type DC resistance welding machine according to a preferred embodiment of the present invention. The welding machine includes a power circuit 10, a pair of electrodes designated 30 and 32 and a power controller 40.

The power circuit 10 includes a rectifier circuit 14, an inverter circuit 20, a welding transformer 22 and a rectifier circuit 24.

The rectifier circuit 14 recieves a commercial three phase AC voltage through a power source terminal 12 and generates a DC voltage which is supplied through a smoothing circuit consisting of a coil 16 and a capacitor 18 to the invertor circuit 20, which in turn converts the DC voltage into a pulse-shaped voltage having a high-frequency, for example 1 KHz. The invertor circuit 20 may conventionally comprise one or more power transistors or field effect trans istors, and the switching operation of the circuit 20 and the resulting pulse width of the high-frequency voltage are controlled by the power controller 40 as will be described hereinafter.

The high-frequency voltage from the inverter circuit 20 passes through the welding transformer 22 which lowers the high-frequency voltage at a predetermined ratio and, thereafter, is rectified by a rectifier circuit 24 consisting of a pair of diodes 26 and 28 into a DC weld voltage. The DC weld voltage is applied to workpieces 34 and 36 to be welded through electrodes 30 and 32 which squeeze therebetween the workpieces 34 and 36 with an adequate pressure during a welding operation.

The power controller 40 comprises a mean voltage computing circuit 42, a troidal coil 44, a waveform regeneration circuit 46, a mean current computing circuit 48 and a power computing circuit 50. The mean voltage computing circuit 42 is connected to the electrodes 30 and 32 and receives from a frequency generator 62 a timing signal TS having the same frequency fo as the inverter switching frequency, and the circuit 42 computes the mean value of the voltage applied between the electrodes 30 and 32 per the period of the timing signal TS and provides a voltage sigaal Sv representing the mean voltage value to the power computing circuit 50. A cable is threaded through the toroidal coil 44 to connect one output terminal of the rectifier circuit 24 with the electrode 32, and the toroidal coil 44 generates an output voltage representing the differential waveform of a weld current I which flows through the electrodes 30 and 32 and the workpieces 34 and 36. The output voltage of the toroidal coil 44 is supplied via the waveform regeneration circuit 46 comprising an integrating circuit to the mean current computing circuit 48. The circuit 48 receives the timing signal TS and computes the mean value of the weld current I per the period of the timing signal TS and provides a voltage signal SI representing the mean current value to the power computing circuit 50.

The power computing circuit 50 computes at the rate of fo the product of the mean voltage (Sv) and the mean current (SI) to produce a voltage signal Sp representing the mean value of the weld power consumed between the electrodes 30 and 32.

The power controller 40 further comprises a power comparision circuit 52, a reference power generator 54, a pulse width control circuit 56, an inverter drive circuit 58 and a sequence circuit 60. The power comparision circuit 52 compares at the rate of fo the voltage signal Sp received from the power computing circuit 50 with a reference signal SQ received from the reference power generator 54 corresponding to a predetermind value of the reference weld power and, produces an error voltage ER as a comparision error between the computed value Sp of the actual weld power and the predetermined value SQ of the reference weld power.

The output of the power comparision circuit 52 or the error voltage ER is supplied to the pulse width control circuit 56 for controlling the high-frequency output of the inverter circuit 20 on a PWM (pulse width modulation) basis. The pulse width control circuit 56 receives a modulation signal such as a triangular waveform signal having the frequency fo from the frequency generator 62 and, compares the error voltage ER with the moduration signal to produce a PWM signal Spwm having binary levels "high" and "low". The PWM signal Spwm is provided via the invertor drive circuit 58 to the invertor circuit 20 to control the ON/OFF switching operation of the transistors therein. The sequence circuit 60 provides the instructions for starting and terminating a welding operation to the pulse width control circuit 56, and makes the reference power generator 54 to generate the reference signal SQ only during a welding operation.

Next, the operation of the circuit configuration of FIG. 1 will be described with reference to the timing diagram of FIG. 2.

At a time ts, a signal for starting the welding operation is supplied from the sequence circuit 60 to the pulse width control circuit 52, and the circuit 52 provides the PWM signal Spwm (FIG. 2-H) to the inverter circuit 20 which then starts its switching operation. Thereby, the inverter circuit 20 generates the high-frequency voltage, the pulse width of which is modulated according to PWM signal Spwm and the output of the circuit 20 is then supplied through the welding transformer 22 and the rectifier circuit 24 to the electrodes 30 and 32 as the DC weld voltage V(FIG. 2-B) and the DC weld current I(FIG. 2-A) flows through the workpieces 34 and 36.

When the welding operation is commenced in the way above, the feedback loop of the constant-power control system according to the invention is operated as follows.

The mean value (FIG. 2-D) of the weld voltage is obtained per the predetermined period To(1/fo) from the mean voltage computing circuit 42 and, on the other hand the mean value (FIG. 2-C) of the weld current I is obtained per the period To from the mean current computing circuit 48. Thus, the mean value (FIG. 2-E) of the weld power consumed between the electrodes 30 and 32 is obtained per the period To from the power computing circuit 50, and is compared with the reference weld power (FIG. 2-F) in the power comparision circuit 52. The resulting comparision error (FIG. 2-G) is supplied from the circuit 52 to the pulse width control circuit 56 which responds to the error and controls the pulse width of the high-frequency output voltage of the inverter circuit 20.

Figure 2:
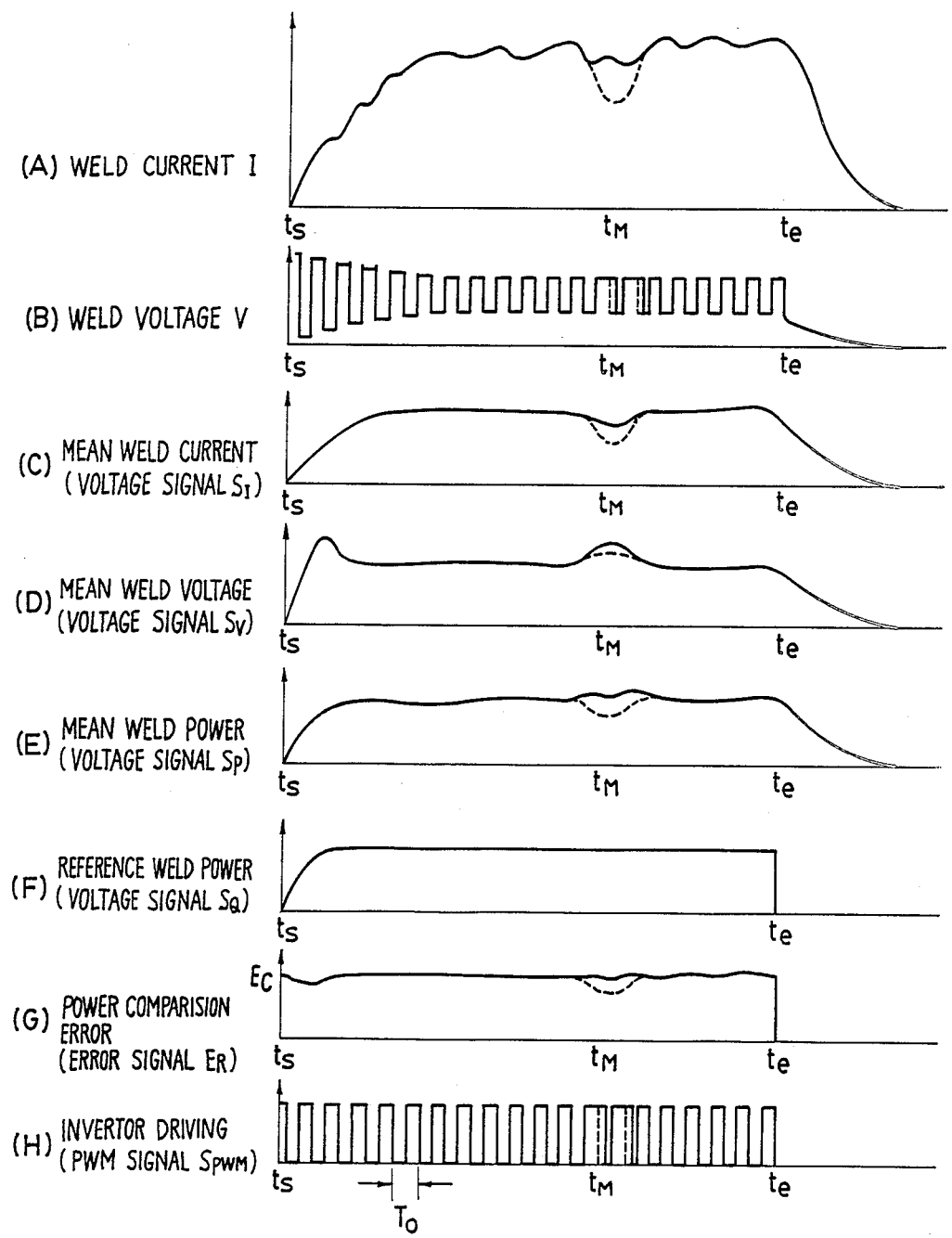
FIG. 2 is a timing diagram of a resistance welding for explaining the operation of the welding machine according to the embodiment.

In accordance with the embodiment, the voltage signal SQ (reference weld power) provided by the reference power generator 50 is set to gradually build up its level as shown FIG. 2-F so that the weld current I and the actual weld power gradually build up their levels as shown in FIGS. 2-A and 2-E respectively in respose to the change in the level of the reference weld power. The error signal ER generated in the power comparision circuit 52 is set to change around a predetermined level Ec of a bias voltage as shown in FIG. 2-G.

It is assumed that in the mid course of the welding operation, for example at a time $t_M$, the whole resistance between the electrodes 30 and 32 rises rapidly and so the weld current I drops rapidly as shown in FIG. 2-A. Then, the mean weld power (FIG. 2-E) tends to decrease due to the drop in the mean weld current (FIG. 2-C). However, the comparision error (FIG. 2-G) changes to decrease below the reference level Ec so that the pulse width of the PWM signal Spwm (FIG. 2-H) correspondingly increases to cancel or compensate the change in the comparision error. Hence, the pulse width of the high-frequency output of the inverter circuit 20 increases so that the pulse width of the weld voltage V applied between the electrodes 30 and 32 increases as shown in FIG. 2-B and, accordingly, the mean weld voltage (FIG. 2-D) increases to compensate the decrease in the mean weld power, thereby assuring that the resistance results in a high and reliable quality of weld.

In FIG. 2, dotted lines near the time $t_M$ show the changes in relevant values or signals respectively, without the function of the constant-power control system according to the embodiment. In such case, the pulse width of the weld voltage V (FIG. 2-B) does not change to hold back the decrease in the weld current I (FIG. 2-A) and, therefore, the mean weld power (FIG. 2-E) rapidly decreases to the degree of power shortage, thereby exerting bad influence on the weld quality.

It is noted in FIG. 2 that the pulse width of the weld voltage and that of the PWM signal Spwm are exaggerated for facilitation of the understanding of the explanation, but actually they have a very short time interval, for example 500 μsec.

Although, a particular embodiment of the invention has been shown and described, alternations and modifications can be made by a person having an ordinal skill in the art without departing from the scope of the present invention defined by the accompanying claims.

What is claimed is:

1. A DC resistance welding machine including a first rectifier circuit for rectifying a commercial AC voltage into a DC voltage, a circuit for converting said DC voltage into a pulse-shaped voltage having a predetermined high-frequency, a welding transformer for transforming said pulse-shaped high-frequency voltage, a second rectifier circuit for rectifying said pulse-shaped high-frequency voltage to a DC weld voltage, said DC weld voltage being applied to workpieces to be welded between electrodes so that a DC weld current for a resistance welding flows through said electrodes and said workpieces, comprising:

means for detecting said DC weld voltage;

means for detecting said DC weld current;

means for computing the value of a weld power actually consumed between said electrodes on the basis of the detection values of said DC weld voltage and of said DC weld current;

means for presetting a reference weld power to any desired constant value;

means for comparing the computed value of said actual weld power with said reference weld power to produce an error signal representative of the comparision error;

means being responsive to said error signal for controlling the pulse width of said pulse-shaped voltage at the rate of said predetermined high-frequency so as to maintain constant said weld power consumed between said electrodes.

2. The DC resistance welding machine as defined in claim 1 wherein said voltage detection means comprises a computing circuit connected to said electrodes for computing the mean value of said weld voltage at the rate of said predetermined high-frequency.

3. The DC resistance welding machine as defined in claim 1 wherein said current detection means comprises:

a toroidal coil for sensing said weld current to generating an output voltage representing the differential waveform of said weld current;

a waveform regeneration circuit for integrating said output voltage from said toroidal coil to generate a voltage signal representing said weld current; and a computing circuit for computing the mean value of said current at the rate of said predetermined high-frequency.

4. The DC resistance welding machine as defined claim 1 wherein said pulse width control means comprises a pulse wave modulation circuit that responds to said error signal from said comparision means to produce a pulse wave modulation signal for controlling the switching operation of said converting means.

5. A weld power control system for a DC resistance welding machine including an inverter in its power circuit, the inverter producing a pulse-shaped voltage at a switching rate, comprising:

means for detecting a DC weld voltage applied between electrodes being depressed against workpieces;

means for detecting a DC weld current flowing through said electrodes and workpieces;

means for computing the value of a weld power consumed between said electrodes on the basis of the detection values of said DC weld voltage and of said DC weld current;

means for presetting a reference weld power to any desired constant value;

means for comparing the computed value of said actual weld power with said reference weld power to produce an error signal representative of the comparison error; and means being responsive to said error signal for controlling the pulse width of said pulse-shaped voltage at the rate of inverter switching so as to maintain constant said weld power consumed between said electrodes.

* * * * *